(12) United States Patent
Chern et al.

(10) Patent No.: US 6,381,465 B1
(45) Date of Patent: Apr. 30, 2002

(54) SYSTEM AND METHOD FOR ATTACHING AN ADVERTISEMENT TO AN SMS MESSAGE FOR WIRELESS TRANSMISSION

(75) Inventors: Vincent Chern; Kevin Thornton, both of San Diego, CA (US)

(73) Assignee: Leap Wireless International, Inc., San Diego, CA (US)

( * ) Notice: Subject to any disclaimer, the term of this patent is extended or adjusted under 35 U.S.C. 154(b) by 0 days.

(21) Appl. No.: 09/399,376

(22) Filed: Sep. 20, 1999

Related U.S. Application Data

(63) Continuation-in-part of application No. 09/384,686, filed on Aug. 27, 1999.

(51) Int. Cl.$^7$ .................................................. H04Q 7/20
(52) U.S. Cl. ...................... 455/466; 455/412; 340/7.21; 340/7.48
(58) Field of Search ............................... 455/466, 31.2, 455/31.3, 38.1, 38.4, 566, 414, 412; 340/825.44, 7.21, 7.48; 709/202, 203, 232; 370/474, 913

(56) References Cited

U.S. PATENT DOCUMENTS

| | | | | |
|---|---|---|---|---|
| 5,555,446 A | * | 9/1996 | Jasinski | 455/412 |
| 5,822,700 A | * | 10/1998 | Hult et al. | 455/466 |
| 5,870,030 A | * | 2/1999 | DeLuca et al. | 340/7.48 |
| 5,873,043 A | * | 2/1999 | Comer | 455/466 |
| 6,047,327 A | * | 4/2000 | Tso et al. | 709/232 |
| 6,101,381 A | * | 8/2000 | Tajima et al. | 455/414 |
| 6,157,814 A | * | 12/2000 | Hymel et al. | 340/7.48 |

* cited by examiner

Primary Examiner—Lester G. Kincaid
(74) Attorney, Agent, or Firm—David R. Yohannan; Mark W. Rygiel; Collier Shannon Scott, PLLC

(57) ABSTRACT

A monitoring and alert system includes a wireless device that sends a monitoring request to a remote server. When the conditions specified by the monitoring request are met, the server generates an SMS alert message. The server determines the maximum length in characters of the SMS message and whether there is sufficient space remaining for an advertisement. If sufficient space is available, the server generates an advertisement and appends it to the SMS alert message. The alert message with appended advertising is then sent to the wireless device.

13 Claims, 15 Drawing Sheets

| LOCATION INFORMATION REQUEST 404 | 1 BYTE |
|---|---|

RESPONSE 408

| TIME 410 | 6 BYTE |
|---|---|
| LONGITUDE 412 | 9 BYTES |
| LATITUDE 414 | 8 BYTES |
| HEIGHT 416 | 8 BYTES |
| SPEED 418 | 3 BYTES |
| DATA AGE 420 | 1 BYTE |

*Fig. 6*

SYSTEM AND METHOD FOR ATTACHING AN ADVERTISEMENT TO AN SMS MESSAGE FOR WIRELESS TRANSMISSION

RELATED APPLICATIONS

This is a continuation-in-part of application Ser. No. 09/384686, filed on Aug. 27, 1999.

FIELD OF THE INVENTION

The present invention relates generally to radio or wireless communications and, more particularly, relates to a method for attaching an advertisement or coupon to an SMS message for wireless transmission.

BACKGROUND OF THE INVENTION

The advent of wireless personal communications devices has revolutionized the telecommunications industry. Cellular, PCS and other services provide wireless personal communications to businesses and individuals at home, in the office, on the road, and any other locations the wireless network reaches. Wireless telephone subscribers no longer have to use pay telephones along the road, or wait until they return home or to the office to check messages and return important business calls. Instead, wireless subscribers carry out their day to day business from their cars, from the jobsite, while walking along the airport concourse, and just about anywhere their signals are accessible.

Thus, it is no surprise that since the introduction of the cellular telephone service, the number of wireless telephone subscribers has increased steadily. Today, the number of wireless telephone subscribers is staggering and still growing rapidly. In fact, many households have multiple wireless telephones in addition to their conventional land-line services.

With a market of this size, there is fierce competition among hardware manufacturers and service providers. In an attempt to lure customers, most providers offer handsets with desirable features or attributes such as small size, light weight, longer battery life, speed dial, and so forth. Many recent additions to the marketplace include multi-functional handsets that even provide pocket-organizer functions integrated into the wireless handset. Most manufacturers, however, are still scrambling to add new features to their communication devices to snare a portion of this booming market.

One desirable feature is for a remote server to be able to monitor for certain conditions and alert the wireless user when those conditions occur. Along with the alert message, it may be desirable to provide advertising or promotional material based on the user's location, profile and content of the alert message. Conventional SMS (Short Message Service) message formats used by wireless devices, however, are limited to particular message types and lengths.

SUMMARY OF THE INVENTION

The present invention is directed toward a system and method for attaching an advertisement to an SMS alert message for wireless transmission.

In one embodiment of the invention, a monitoring and alert system is provided. The system includes a requesting device that has a transmitter for sending a monitoring request and a receiver for receiving an alert message over a wireless communication network. In one implementation, the requesting device is a wireless communication handset or a personal computer.

A remote server communicates with the requesting device over the network. The server receives the monitoring request from the requesting device and monitors for the conditions specified by the requesting device in the monitoring request. When the conditions are met, the server generates an SMS alert message and appends an ad message to the alert message in the remaining message space to create a composite alert/ad message. The server then sends the composite alert/ad message to the requesting device.

In one implementation, the system also includes a position determination device for determining the location of the requesting device. The requesting device provides the location, along with user profile information, to the server to assist in generation of the composite message. The server may comprise an agent server that monitors for the conditions specified by the requesting device; an ad server that generates the ad message; and an alert server that generates the alert message and appends the ad message to the alert message to create the composite message.

In another embodiment of the present invention, a method for appending an advertisement to an SMS alert message is provided. The method includes the steps of:

(a) determining the maximum length in characters of the SMS message;

(b) generating an alert portion of the message;

(c) determining the available advertising message space by subtracting the length in characters of the alert portion from the maximum message length;

(d) determining whether the available advertising message space is sufficient for placement of an advertisement; and (e) if the available space is sufficient, generating the advertisement and appending it to the first portion of the SMS message.

Objects and advantages of the present invention include any of the foregoing, singly or in combination. Further objects and advantages will be apparent to those of ordinary skill in the art, or will be set forth in the following disclosure.

BRIEF DESCRIPTION OF THE DRAWINGS

The present invention is described with reference to the accompanying drawings. In the drawings, like reference numbers indicate identical or functionally similar elements, and.

FIG. 6 is a diagram of example formats for location information requests responses.

FIG. 16 illustrates example display screens of wireless devices showing an alert message and an appended advertising message.

DETAILED DESCRIPTION OF PREFERRED EMBODIMENTS

1. Introduction and Overview

The present invention provides a location-based information retrieval system and method for wireless communication devices. A position determination system is included with the wireless communication device to allow the location of the device to be determined. The location of the device can be used to provide additional information or features to a user of the wireless communication device. Examples of the information that may be provided include map information; driving information; location information; location of retailers, goods, services, or other points of interest near the communication device; and any other information that may be useful or valuable to a user of the communication device. The device location is sent to a remote server that accesses and compiles the requested information and sends it back to the user via the communication device.

An alert or notification service is also provided. With this feature, the user is automatically alerted about selected types of news, events, promotions, flight schedules, stock information, etc. The server typically sends the alert messages to the user's handset in a Short Message Service (SMS) format. A method is provided for appending promotional or advertising messages to the SMS alert message.

2. Example Environment

Before describing the invention in detail, it is useful to describe an example environment in which the invention can be implemented. One example environment is a handset or communication device operating within a wireless communication network such as, for example, a cellular, GSM, PCS or radio communication network. Wireless communication devices embodying the present invention can be implemented in various configurations and architectures. Typically, a wireless communication device will include a keypad for control of the device and data entry, and a display for displaying relevant information.

Figure 1:
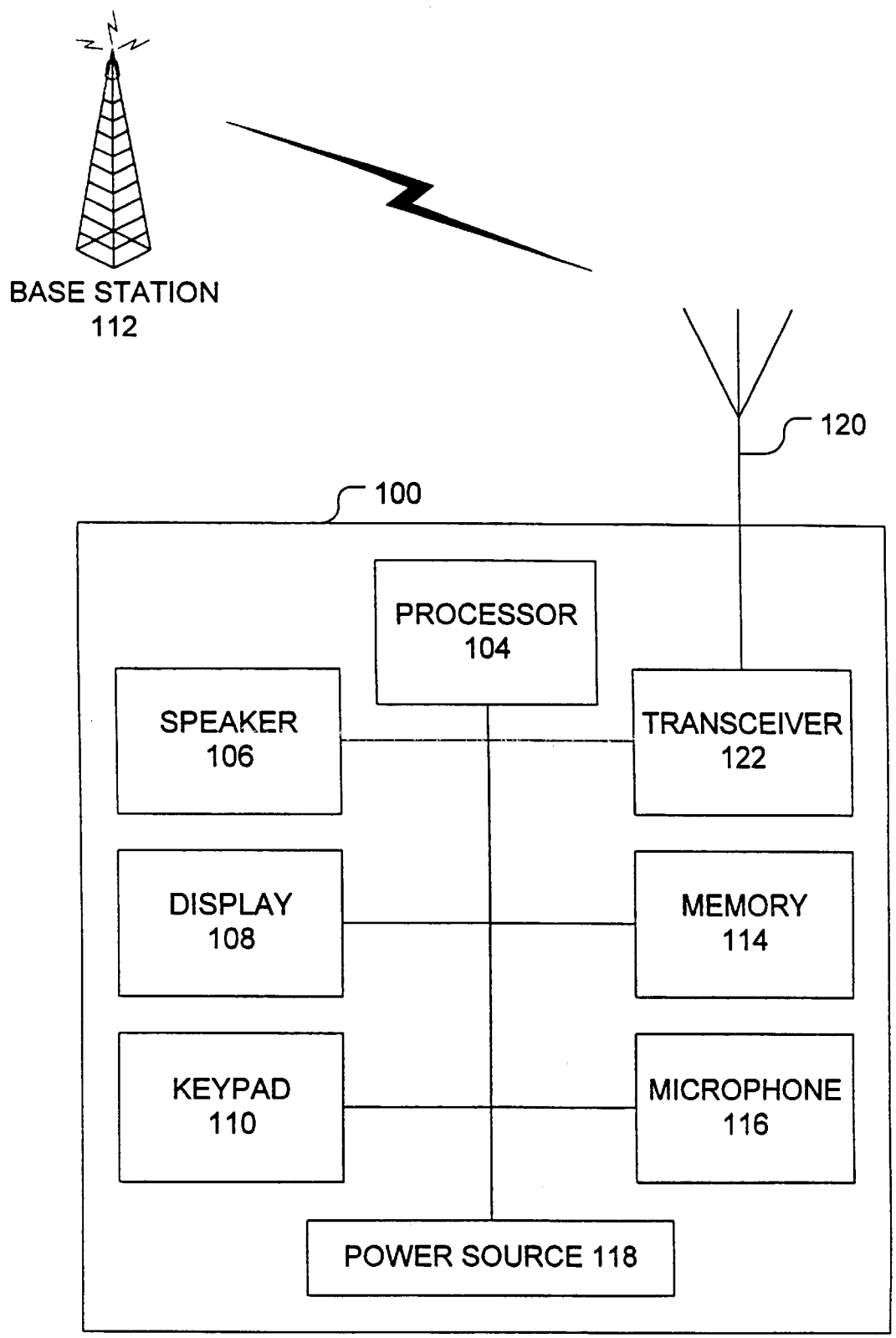
FIG. 1 is a diagram illustrating an example wireless communication device.

An example wireless communication device 100 is illustrated in FIG. 1. Communication device 100 is presented for illustrative purposes only; implementation of the invention is not dependent on any particular device architecture or communication network.

Device 100 includes a processor 104, a speaker 106, a display 108, a keypad 110, a transceiver 122, a memory 114, a microphone 116, a power source 118 and an antenna 120. Device 100 is typically a mobile device such as a handheld handset or an integrated vehicle phone. It is configured to communicate with other communications devices such as base station 112. Base station 112 is typically within a geographic area known as a "cell" and handles communications for all wireless devices within the cell.

Processor 104 directs the overall operation of device 100. A computer program or set of instructions is typically coded or otherwise implemented on the processor to enable the processor to carry out the device operation. Memory 114 interfaces with processor 104 and may store program code and provide storage space for data useful in executing the program code and carrying out the device functions. Memory 114 may be implemented as ROM, RAM or any other convenient memory format. The features and functionality of the invention described below may be implemented using hardware, software, or a combination thereof, and such software can run on a processor such as processor 104 and be stored in a memory such as memory 114.

Transceiver 122 includes a transmitter that transmits voice and data information via antenna 120 to a recipient communication device such as, for example, base station 112. Transceiver 122 also includes a receiver that receives voice and data information from another communication device (e.g., base station 112). The received voice and data information is provided to the user or used to facilitate device operation.

User interface features include speaker 106, display 108, keypad 110, and microphone 116. Microphone 116 accepts voice or other audio information from the user and converts this information into electrical signals that can be transmitted by transceiver 122. Likewise, speaker 106 converts electrical signals received by transceiver 122 into audio information that can be heard by a user of device 100. Display 108 displays information such as call information, keypad entry information, signal presence and strength information, battery life information, or any other information useful to the user. Display 108 preferably takes the form of a liquid crystal display (LCD), which have low power consumption characteristics, but could also be implemented as a light emitting diode (LED) display or any other appropriate visual indicator. Keypad 110 typically includes an alphanumeric keypad and may also include special function keys. In one embodiment, keypad 110 is backlit to permit viewing of the keys in low light or dark conditions. Device 100 may also include a flip panel (not shown) that can be closed to conceal some or all of the keypad.

Power source 118 is provides power to device 100. It can be implemented with rechargeable batteries, such as NiCad or NiMH rechargeable batteries, or with any other suitable power source.

3. A Location-Based Information Retrieval System

Figure 2:
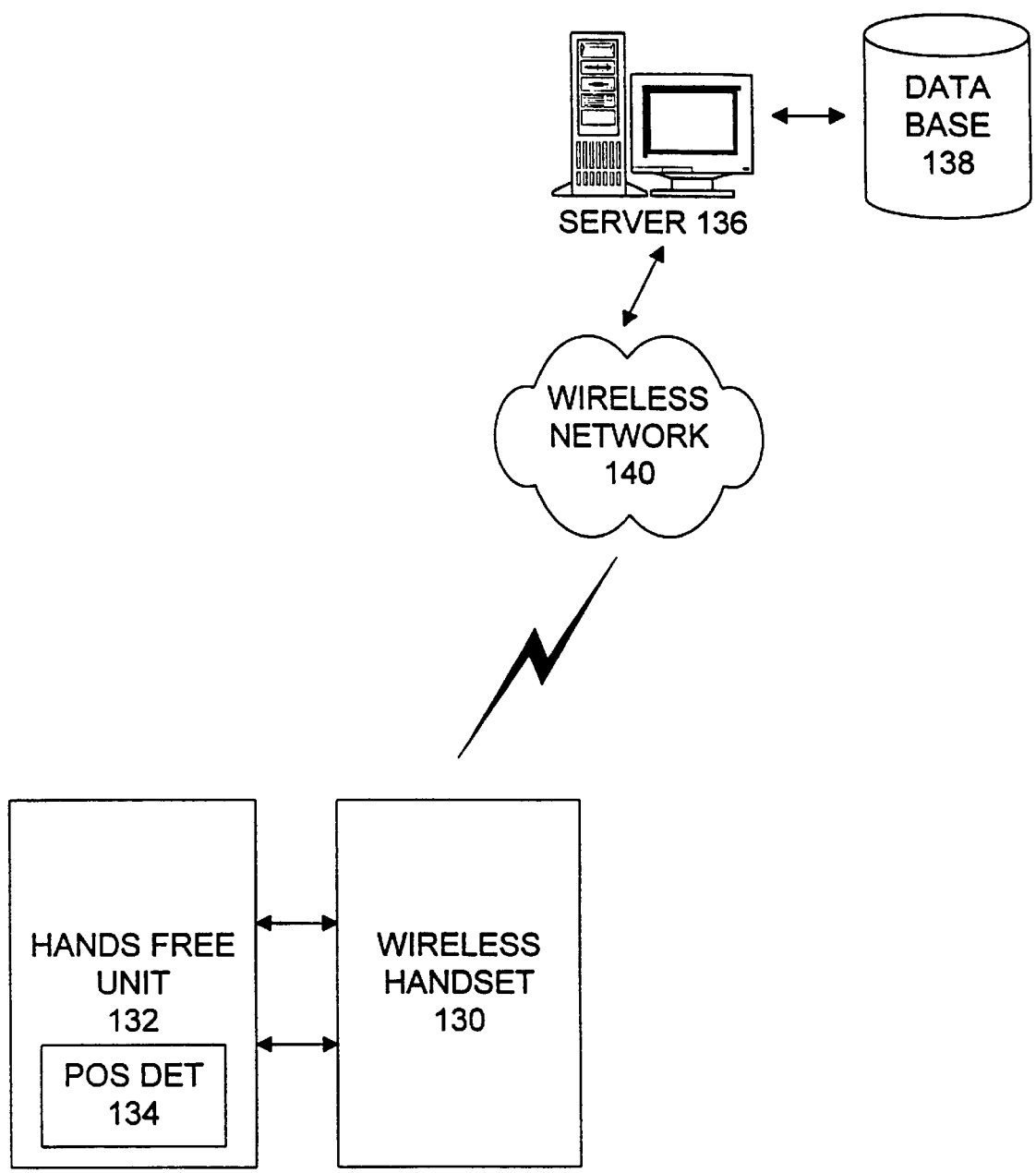
FIG. 2 is a block diagram of a wireless communication system according to the present invention.

FIG. 2 is a block diagram illustrating a wireless communication system according to the present invention. The communication system provides information to a wireless device user based on the location of the user and his device. It includes a wireless handset 130 and a hands-free unit 132. Handset 130 can be implemented in a configuration such as device 100 of FIG. 1, or in any other wireless communication device capable of communicating with remote locations via a wireless communication medium. In the description below, "handset" refers to any communication device capable of communicating with other devices via a wireless medium.

Hands-free unit 132 is optionally provided to allow the user of wireless device 130 to communicate in a hands-free mode. Hands-free unit 132 may include a microphone and speaker to provide wireless device 130 with speakerphone-like capabilities. Such capabilities are particularly desirable where wireless device 130 is utilized in an automobile or other mobile situation. In one implementation, hands-free unit 132 is configured according to conventional industry standards for a "hands-free kit".

In addition to the conventional standards, hands-free unit 132 is equipped with a position determination system 134 to determine the location of unit 132 and handset 130. Alternatively, position determination system 134 may be directly incorporated into handset 130. Position determination system 134 determines location in terms of parameters such as latitude, longitude, height, speed of travel, and any other useful location or position parameters. In one embodiment, position determination system 134 is implemented using a GPS (global positioning system) or differential GPS. The design and configuration of GPSs is well known to those of ordinary skill in the art. Alternative position determination systems could also be utilized.

One example of an alternative position determination system is a triangulation system. In such a system, the position of handset 130 is determined by triangulating a signal from handset 130 with the fixed locations of two or more base stations. Triangulation systems, though useful and relatively inexpensive, have several drawbacks. Errors due to multipath signal transmission may occur and the systems may be inoperable in areas where only one base station is available.

Wireless device 130 preferably includes both a voice and data interface, particularly where position determination system 134 is incorporated in a hands-free unit 132. The voice interface provides hands-free operation and speakerphone-like capabilities. The data interface allows position information obtained by system 134 to be provided to handset 130 for transmission over wireless network 140. Moreover, where voice recognition or speech synthesis capabilities are provided (discussion below), the data interface provides the data to be synthesized into speech or the data received via voice recognition.

Handset 130 communicates with other entities via wireless network 140. Network 140 is typically comprised of a plurality of base stations that provide relay points for communication. Network 140 may be a cellular, PCS, GSM, or any other wireless communication network. In addition to conventional communication with other wired or wireless communication devices, as shown in FIG. 2, network 140 permits communication between handset 130 and data server(s) 136. When a user requests information, handset 130 provides the location of the handset to server 136 across wireless network 140. Server 136 retrieves relevant information from an associated database 138 and conveys the information to handset 130 over wireless network 140. The information may be displayed on the handset display or audibly rendered via speech synthesis or prerecorded scripts. Although the types of information stored in database 138 are virtually limitless, several example applications are provided for illustrative purposes.

In one example application, driving directions to a destination address are provided to a handset user. The user requests driving directions to the destination via keypad entry and/or voice command, and the request is communicated to server 136 over wireless network 140. At the time of the request, the handset location determined by position determination system 134 is also provided to server 136 to provide a starting point for the directions. Using the handset location and the destination address, server 136 calculates a route and compiles driving directions. The driving directions are transmitted to handset 130 over network 140 and are displayed or audibly rendered to the user. In addition to textual driving directions, a map showing the route may be displayed on the handset display. Options such as the shortest possible route, interstate route, safest route, most scenic route, etc. may be provided. The user's choice of options will dictate the route calculation. The options may be stored, and prompts or scripts generated, locally (in the memory of handset 130). Alternatively, the options, prompts and scripts may be stored at server 136 and provided to the user via network 140.

Another example application locates particular types of businesses or services in the user's location. Restaurants, gas stations, hotels and other businesses or services near the user's location can be identified and provided to the user. Again, the user requests the business or service type vocally or via keypad entry. The request is communicated to server 136 over wireless network 140, along with the user's current location as determined by the position determination system 134. Server 136, based on the handset location and user request, retrieves and returns relevant information to handset 130 over network 140.

Parameter limits or filters may be implemented to refine the request and selections returned. The user may set a location filter, for example, that requires returned selections be within X miles of the user's current location. If the user is seeking a restaurant, the user may request or be prompted to select parameters that refine the search results. These parameters may include cuisine type (e.g., Italian, French, American, etc.), restaurant type (e.g., fast food, casual dining, formal, etc.), price range and so on. For restaurants as well as gas stations, motels and other businesses, the user may identify a preferred national or regional chain.

As noted above, the search may be refined (the query narrowed) on the user's own initiative or based on system prompts. If the user simply requests a nearby restaurant, for example, server 136 may prompt the user with questions about parameters such as those described above. Alternatively, to conserve bandwidth over network 140, prompts can be stored locally and made by handset 130 (or hands-free unit 132) before the request is sent to server 136. In this embodiment, updated scripts and/or prompts may be downloaded from server 136 to handset 130. Preferably, memory-intensive data such as establishment locations, driving directions, etc. are stored in database 138 to minimize the amount of memory required in handset 130. The precise distribution of data storage among these devices will be influenced by factors such as available bandwidth, memory costs and airtime costs.

The user may also specify avoidance of certain areas or parts of town, such as those that have high crime rates, gang or drug activity, or other undesirable attributes. Crime statistics from law enforcement authorities or other sources can be compiled and stored in database 138. Based on these statistics, certain areas or neighborhoods may be identified as high crime rate areas or otherwise undesirable areas. The user may opt to not receive choices for establishments in, or driving directions through, those areas. This feature can be implemented automatically, as a default selection or through a user prompt. Alternatively, the system may provide an automatic warning sound or indication to alert the user of entry into a high-crime-rate area. This feature is particularly useful if the user is unfamiliar with a particular area in which he or she is travelling.

Figure 3:
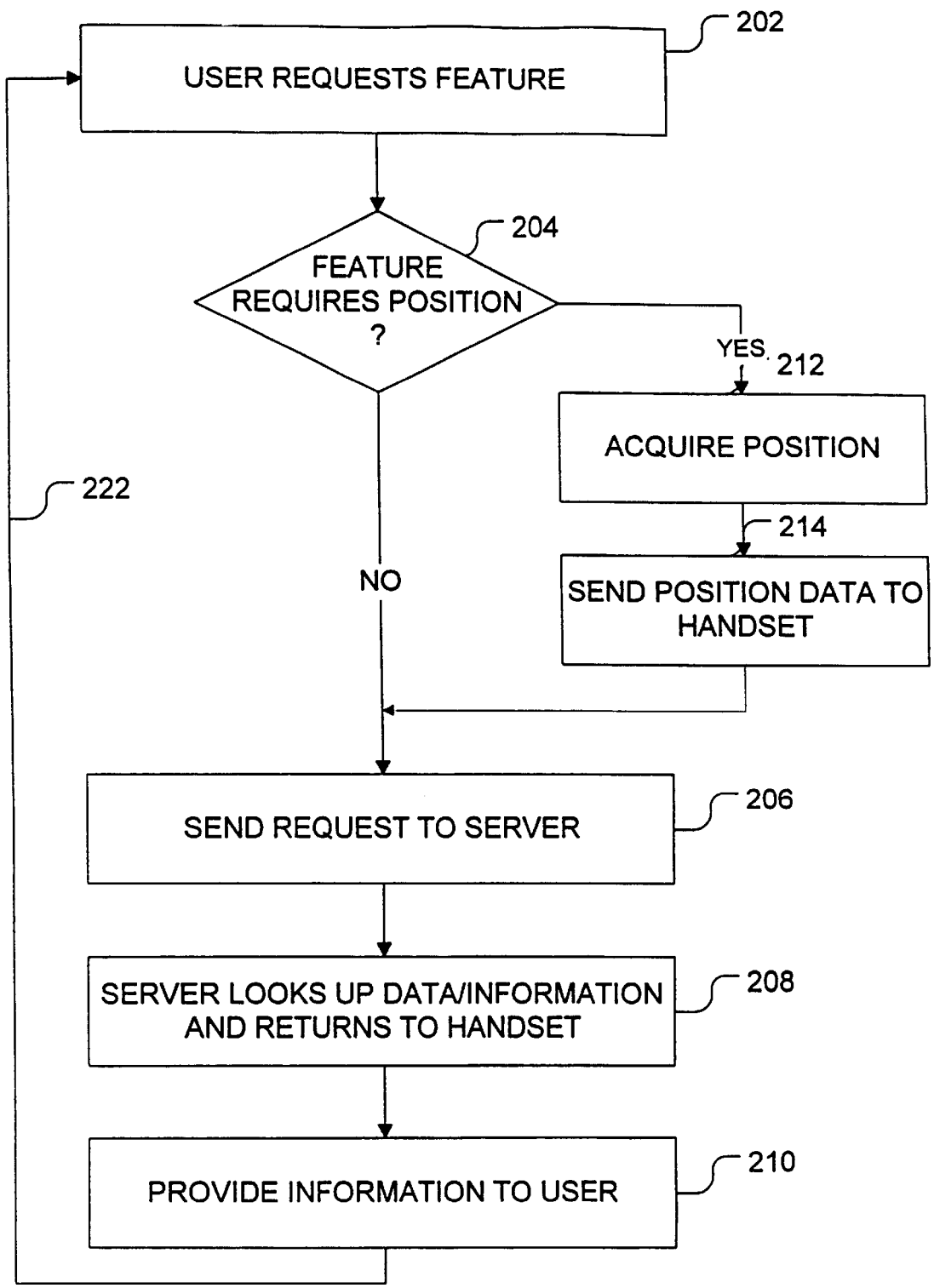
FIG. 3 is a flowchart illustrating a method for requesting information across a wireless network according to the present invention.

A method for requesting information across network 140 is illustrated in FIG. 3. In step 202, a user initiates a request for information. As described above, this request can be made via a keypad entry or by voice command with an appropriate voice recognition system. In step 204, the system determines whether the request requires the handset location or position. If all information is based on positional information, this step can be eliminated on the assumption that answering any request requires positional information. Since many requests may be fulfilled based on previously transmitted position information or without any position information at all, however, inclusion of step 204 is preferable to avoid unnecessary transmission of position information over network 140.

If position information is required, the method proceeds from step 204 to step 212, where position determination device 134 acquires the position of handset 130. In one implementation, position determination occurs somewhat constantly while handset 130 (or unit 132) is powered on. If position determination device 134 is situated in hands-free unit 132, unit 132 provides the position data to handset 130 for transmission to server 136 over wireless network 140 (step 214). If position information is not required, the method proceeds from step 204 directly to step 206.

In step 206, handset 130 sends the request to server 136 via wireless network 140. The request includes any position data acquired in steps 212–214. In step 208, server 136 retrieves the data or information requested from database 138. The data may be retrievable and usable in raw form, or it may need to be processed. This determination is based on the type of request, the information requested, and the manner or format in which the information is stored in database 138. The raw or processed data is communicated to handset 130 over network 140 and, in step 210, is displayed or provided to the user.

As described above, scripts or prompts may be provided to the user to refine the information request. If the scripts or prompts are stored in database 138 (as opposed to local storage in handset 130), they are retrieved by server 136 in step 208 and provided to the user in step 210. The user's answers to the prompts are sent by handset 130 to server 136, which uses the refined information to retrieve additional data or information from database 138, or to further refine the user's query. This potentially repetitive process is illustrated in FIG. 3 by flow line 222 and the repetition of steps 202, 206 and 208. During this repetitive prompting process, depending on time elapsed and distance traveled, updated position information may be provided to server 136. If the refining prompts are stored locally in device 130 or unit 132, refinement occurs before the query is sent and this repetitive process will not usually be necessary.

Once the request has been sufficiently refined, server 136 uses the refined request to retrieve data from database 138. Continuing with the examples described above, server 136 may retrieve locations of restaurants, gas stations, hotels, or other facilities or services near the user. In one implementation, the information is listed or ranked in order of best matches to the user's request and/or preferences. The listing of facilities or services matching the request is provided to handset 130 over network 140 (step 208), and the information is audibly or visually provided to the user (step 210). If the information is provided audibly, audio data can be prerecorded or synthesized by server 136 and transmitted over network 140, or data can be sent across network 140 and speech synthesized locally. If the information is provided visually, it is typically provided in a Short Message Service (SMS) format.

Once the user selects a facility or service from the list of options provided, server 136 can retrieve or compute driving directions to the facility or service based on the user's current position. If sufficient time has elapsed to significantly alter the user's current position, server 136 may request a position update. In one implementation, a speed of travel parameter is provided by handset 130 along with the current position. In this implementation, the determination of whether to update the position information can be based in part on this parameter. Where the user is traveling at a high rate of speed, positional updates will be required often to ensure accurate directions. Additionally, where the user is approaching a freeway exit or other waypoint in the route being computed, server 136 may request a position update to ensure that this waypoint has not been passed. If it has been passed, an alternative route may be calculated or the user may be directed to backtrack to the passed waypoint.

4. Implementation of a Location-Based Information Retrieval System

FIGS. 8–14 depict in more detail a method 600 for location-based information retrieval using a wireless communication device such as handset 130. As in the information retrieval system described above, handset 130 communicates with a server 136 and database 138 over a wireless network 140. In method 600, a web site maintained on server 136 handles user requests for information. The web site includes a "services home page" that serves as an index to the available information services. Handset 130 is equipped with an Internet browser or minibrowser program that accesses server 136 via network 140 and pulls the services home page to handset 130. The home page is displayed on the handset display 108.

Figure 8:
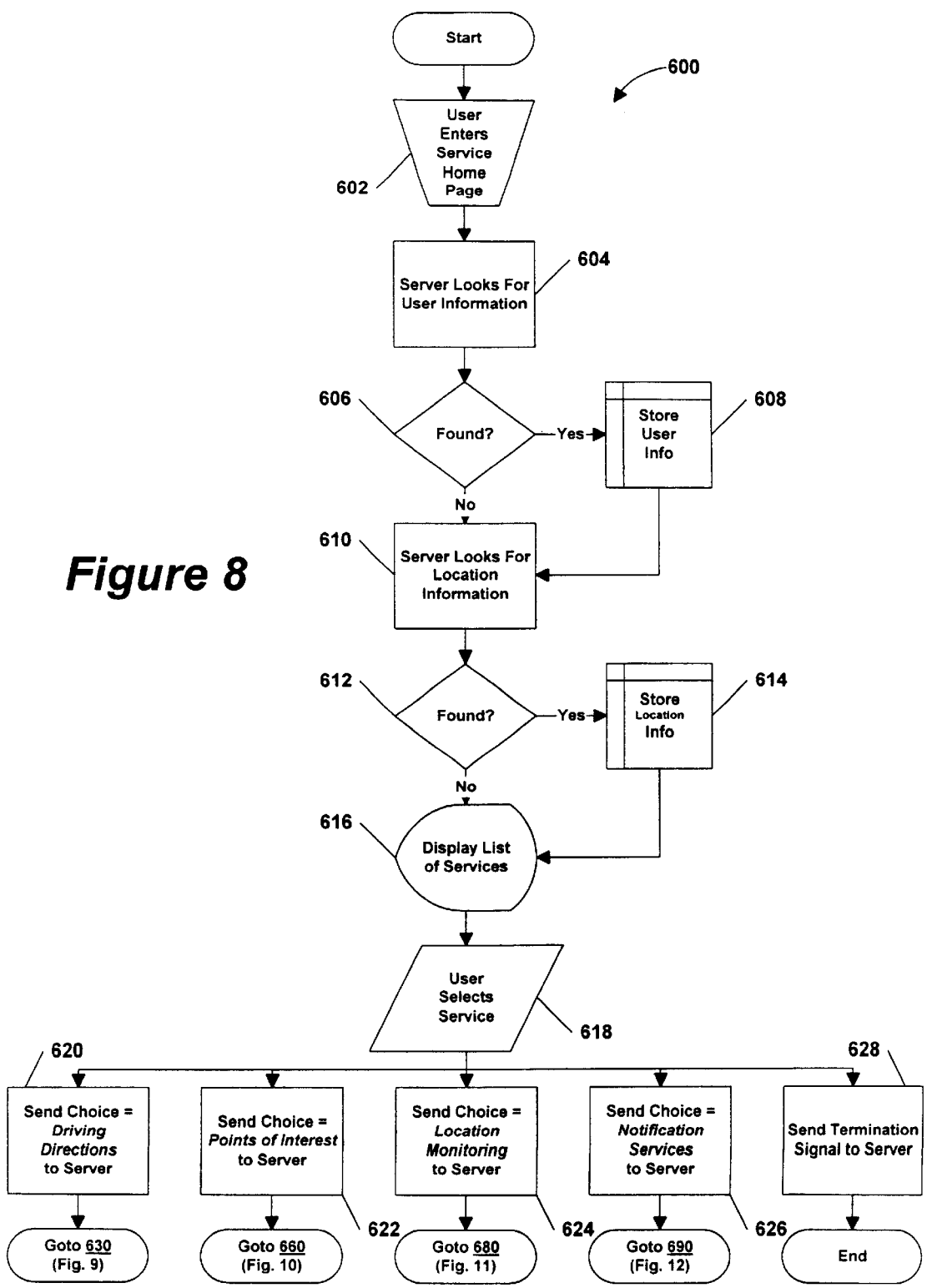
FIG. 8 is a flowchart showing one implementation of a location-based information retrieval system according to the present invention.

Referring to FIG. 8, the user enters the services home page via handset 130 or another appropriate portable or navigational device (step 602). Keypad 110 of handset 130 may include a special function key that permits activation of the minibrowser and loading of the services home page from server 136 in one keystroke. In step 604, as soon as the user has entered the home page, server 136 automatically attempts to retrieve from handset 130 information stored in the handset memory relating to the user, the user's preferences and handset 130 ("user information"). The user information, if available, is useful to server 136 in formatting a response to information requests based on the user's past preferences.

The user information may be stored in the handset memory as a data file or "cookie" created by server 136, and may be periodically updated by server 136. At decision node 606, if server 136 found the user information, the user information is stored on server 136 (step 608) and the method proceeds to step 610. If the user information was not found, the method proceeds directly to step 610. Though not shown in FIG. 8, if user information is not found, the method could include an additional step of creating a user data file or cookie and storing it in the handset memory.

In step 610, server 136 attempts to retrieve from handset 130 the location of handset 130 as determined by position determination system 134. At decision node 612, if server 136 was able to retrieve the location of handset 130, the location information is stored on server 136 (step 614) and the method proceeds to step 616. If server 136 was not able to retrieve the location information, the method proceeds directly to step 616.

The home page index or list of services is displayed on handset 130 in step 616. All available information retrieval services are listed for the user to choose from. A selection for ending the information services session may also be provided. If handset 130 has voice synthesis capability, the available selections could be audibly announced to the user.

Although the potential types of information retrieval services are virtually limitless, for exemplary purposes, four types of information retrieval services are discussed below.

One implementation of a location-based information retrieval system includes a driving direction service, a points of interest service, a location monitoring service, and notification services. If driving directions are selected, an additional traffic monitoring service is available. In step 618, the user selects one of the listed services via the handset user interface. The selection may be made through use of a menu navigation key, by pressing a keypad number corresponding to the desired service, or if voice recognition capability exists, by stating the selection.

In steps 620–628, handset 130 sends the appropriate service choice to server 136 over network 140. If the driving directions service (step 620) is selected, the system proceeds to node 630 of FIG. 9. If the points of interest service (step 622) is selected, the system proceeds to node 660 of FIG. 10. If the location monitoring service (step 624) is selected, the system proceeds to node 680 of FIG. 11. If the notification services (step 626) are selected, the system proceeds to node 690 of FIG. 12. Finally, if the user opted to end the information services session, an appropriate termination signal is sent to server 136 (step 628) and the session is ended.

Figure 9:
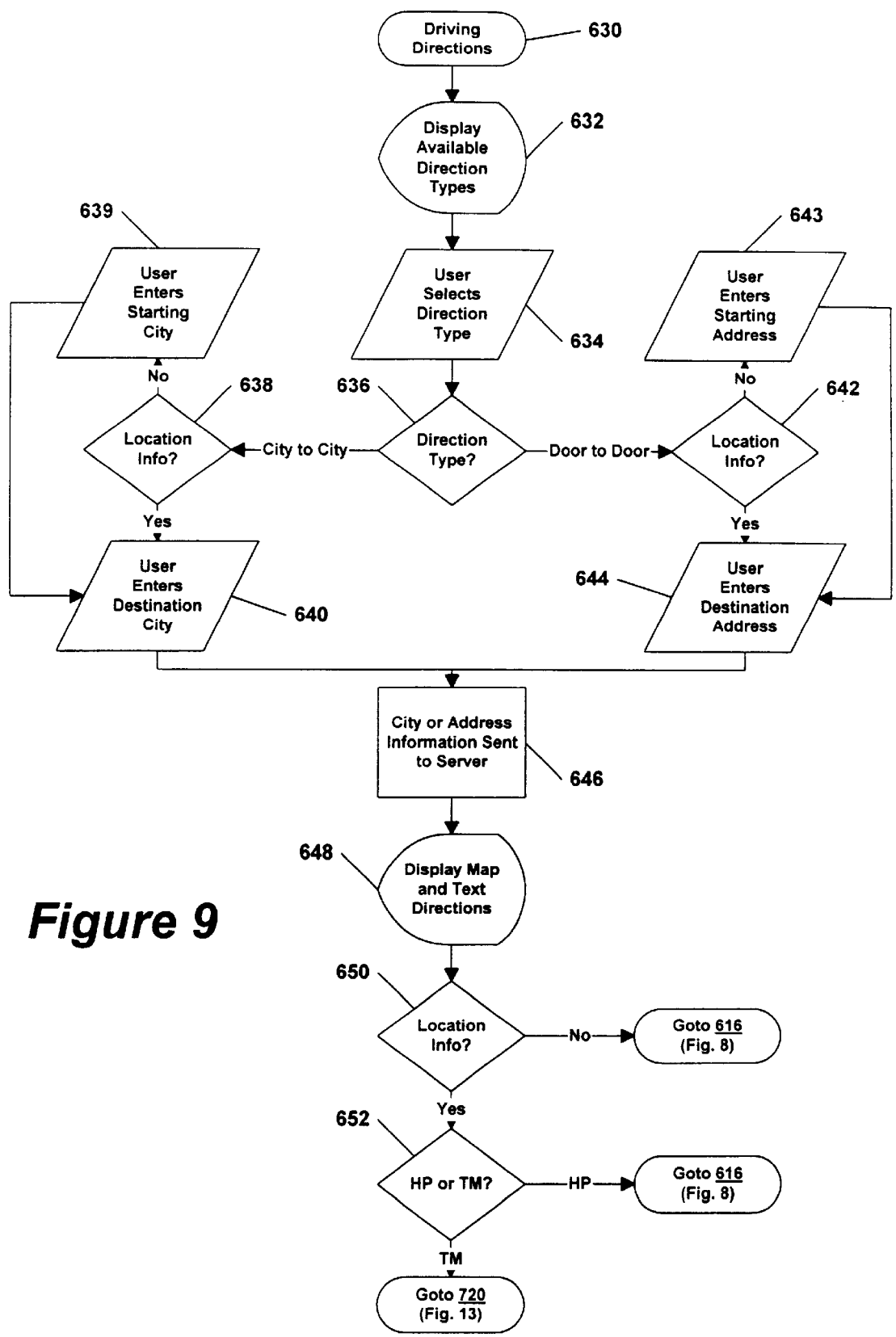
FIG. 9 is a flowchart of a driving directions service portion of the information retrieval system.

A sub-method for providing location-based driving directions in response to a user request (step 620) is shown in FIG. 9 starting at node 630. The available types of driving directions are displayed on handset 130 (step 632). In one implementation, city-to-city and door-to-door driving directions are available. The scripts and prompts related to the types of driving directions available for selection may be stored remotely on server 136 or locally on handset 130. In step 634, the user selects the desired direction type, which is sent to server 136 over network 140.

The method proceeds according to which type of directions is requested (decision node 636). If city-to-city directions are requested, the method proceeds from node 636 to step 638. At step 638, if location information was available from handset 130 (see step 610 of FIG. 8), the starting city is already known and the method proceeds to step 640. If location information was not available, the user will first be required to enter the starting city (step 639). At step 640, the user enters the destination city. If door-to-door directions were requested, the method proceeds from node 636 to node 642. At step 642, if location information was available from handset 130, the starting address is already known by server 136 and the method proceeds directly to step 644. If location information was not available, the user will first be required to enter the starting address (step 643). At step 644, the user enters the destination address.

At step 646, the city(s) or address(es) entered by the user are sent from handset 130 over network 140 to server 136. Server 136 uses the handset location and the destination address or city to calculate a route and compile driving directions. If necessary, server 136 may access database 138 or other Internet servers to assemble the route and directions. The driving directions are transmitted to handset 130 over network 140 and are displayed or audibly rendered to the user (step 648). In addition to textual driving directions, a map showing the route may be displayed on the handset display. User preferences such as the shortest possible route, interstate route, safest route, most scenic route, etc. may dictate the route calculation. If such preferences exist, they would have been retrieved by server 136 from handset 130 in steps 604–608 (FIG. 8).

If location information is available from handset 130 (decision node 650), the user is presented with the additional option of activating a traffic monitoring (TM) service (decision node 652). If location information is not available, or if it is available but the user opts not to activate the traffic monitoring service, the method returns to step 616 of FIG. 8. The home page (HP) services are listed, and the system waits for the next user selection. If location information is available and the user opts to activate the traffic monitoring service, the system proceeds to the traffic monitoring sub-method of FIG. 13 (node 720).

If the traffic monitoring service is selected, handset 130 periodically sends its location to server 136 while in transit according to the driving directions, and server 136 determines whether there are any impediments such as accidents or construction work along the calculated route. If impediments are present, the server may configure an alternate route. The traffic monitoring sub-method is illustrated in detail in FIG. 13 starting at node 720.

Figure 13:
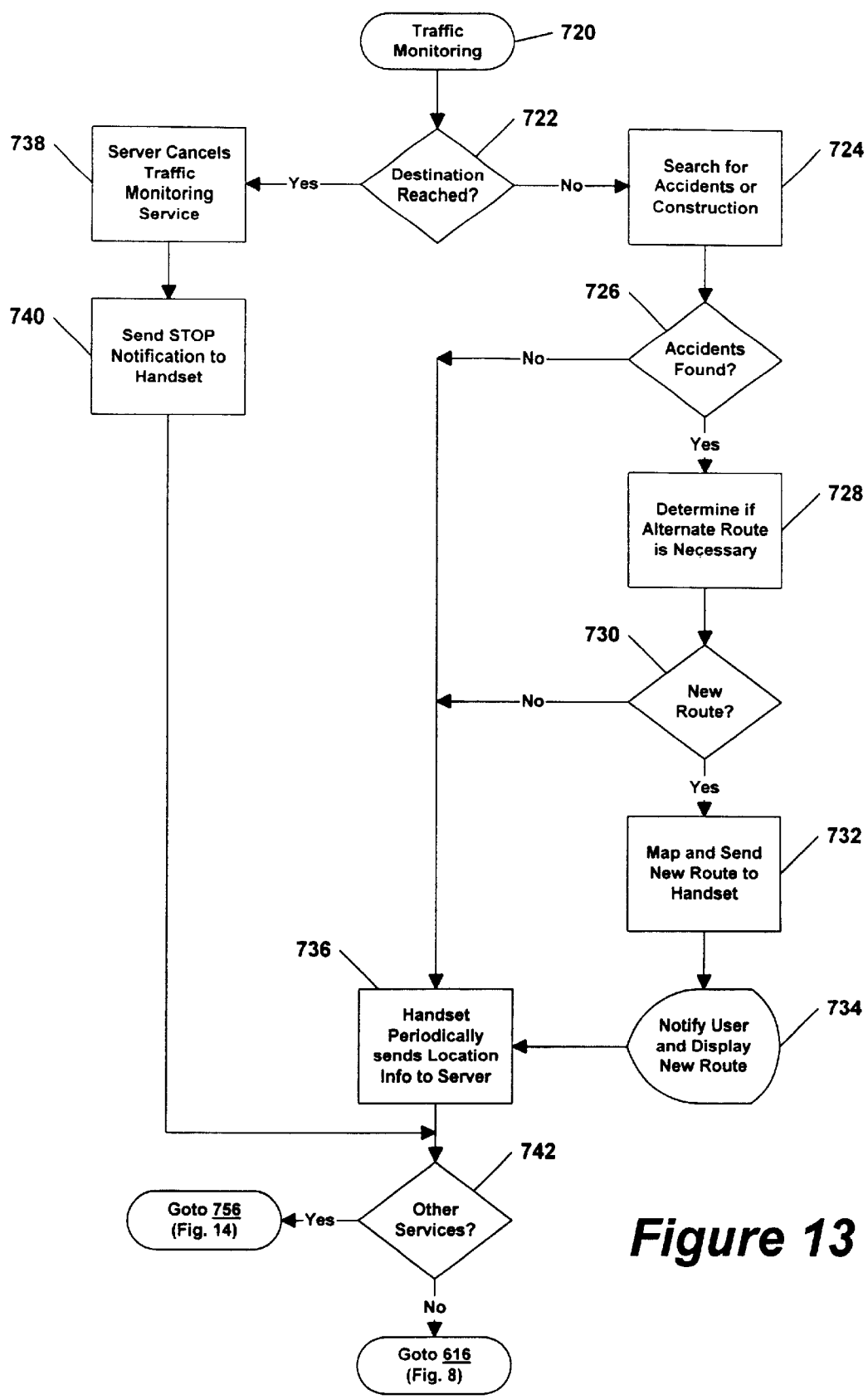
FIG. 13 is a flowchart of a traffic monitoring service portion of the information retrieval system.

Referring to FIG. 13, server 136 first assesses whether the destination address or city has been reached (step 722). If the destination has been reached, the traffic monitoring service is no longer necessary. Accordingly, the server cancels the traffic monitoring service (step 738) and sends a message over network 140 instructing handset 130 to cease sending periodic location updates (step 740). The method then proceeds directly to step 742.

If the destination has not been reached, server 136 searches for any accidents, construction work or other impediments or hazards between the current handset location and the destination (step 724). In one implementation, this is accomplished through a check of real time data maintained on database 138 or elsewhere on the Internet. If no impediments are found (decision node 726), the original route is not disturbed and the method proceeds to node 736. If an impediment is found, the server determines if an alternate route is necessary (step 728). In one implementation, the user's current speed (provided by handset 130) and the estimated clearing time of the impediment are considered in determining whether an alternate route should be calculated. If these factors do not dictate an alternate route (decision node 730), the original route is again left undisturbed and the method proceeds to step 736. If a new route is necessary, it is mapped and compiled as described above with reference to FIG. 9 (step 732). The user is notified of the change and the new route and map are sent to and displayed by handset 130 (step 734). Information about the accident or impediment necessitating the route change is also preferably provided to the user.

Figure 14:
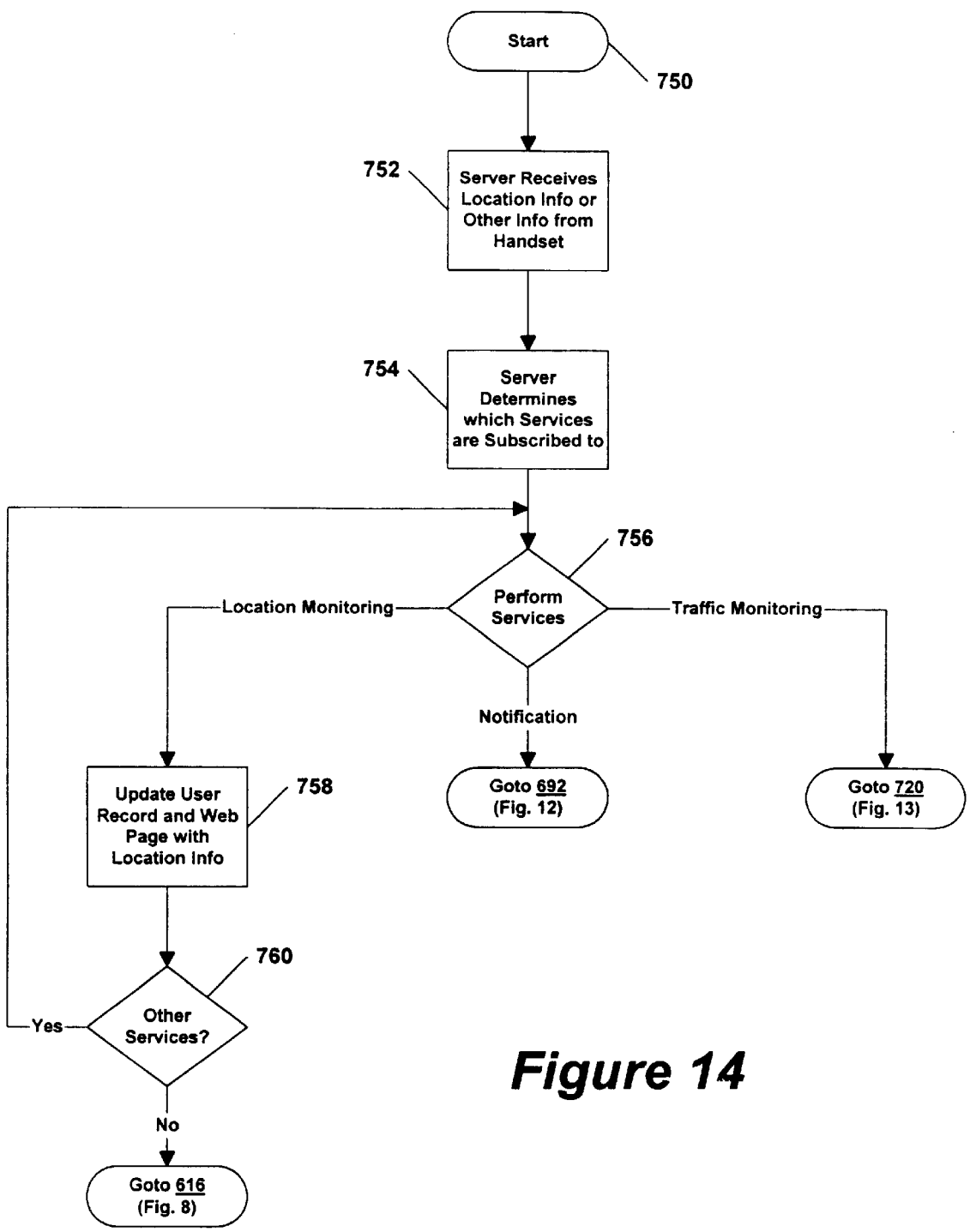
FIG. 14 is a flowchart of a server routine for performing subscribed user services.

As indicated by step 736, handset 130 continues to periodically update server 136 with location information as long as the traffic monitoring routine remains active (e.g., until the user reaches the destination). If the destination has been reached, the periodic updates are stopped. At step 742, server 136 determines whether it needs to attend to other services in addition to the traffic monitoring service. If there are additional services, the system proceeds to step 756 of FIG. 14. FIG. 14 illustrates the steps followed by server 136 each time a location or user information update is received, and will be described in more detail below.

Figure 10:
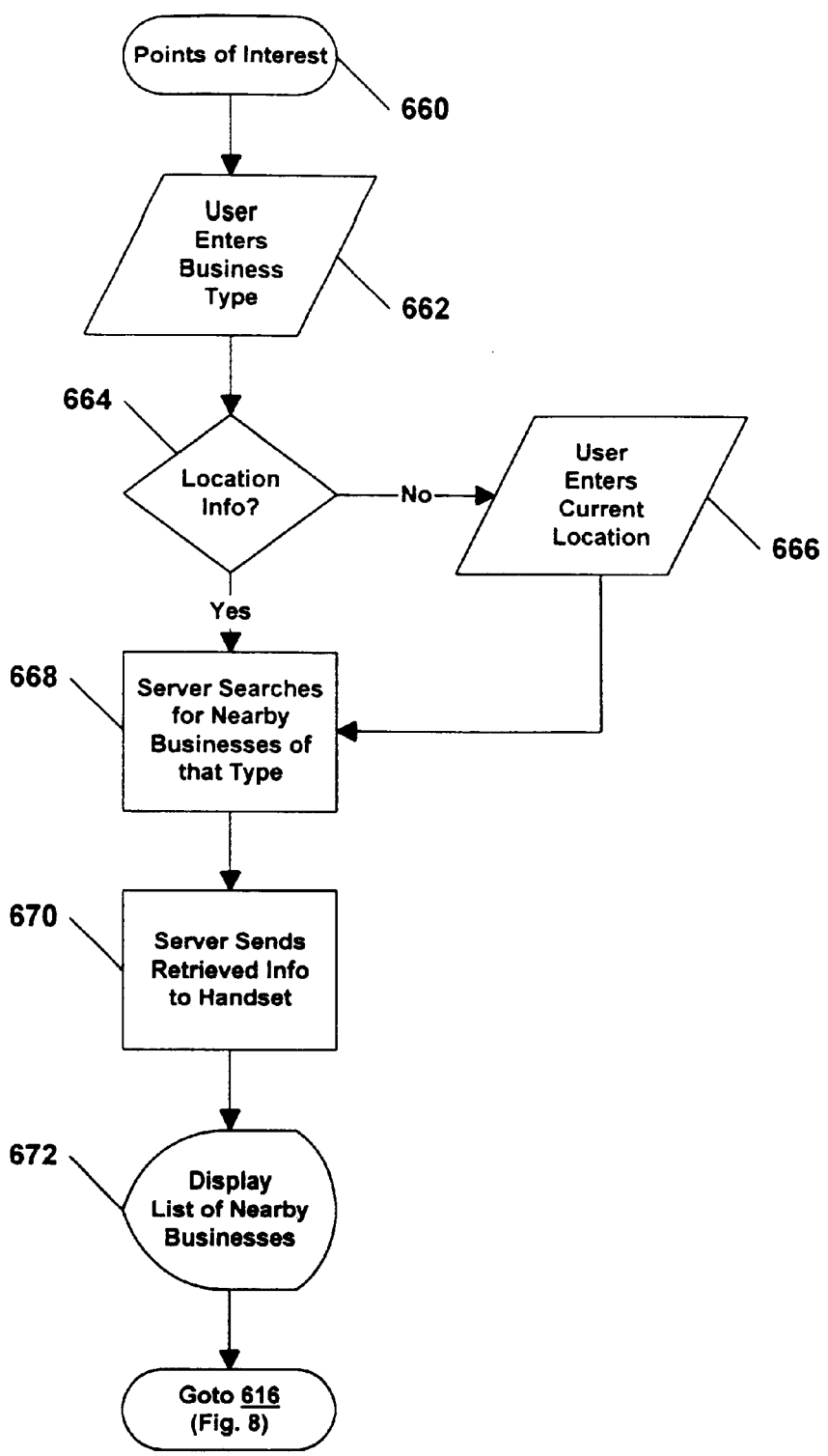
FIG. 10 is a flowchart of a points of interest service portion of the information retrieval system.

Referring again to FIG. 8, another location-based information retrieval service identifies certain points of interest near the user's current location (step 622). The submethod for retrieval of information about points of interest is illustrated in FIG. 10, beginning at node 660. At node 662, the user is prompted to enter the business or type of facility she would like information about. Examples include restaurants, gas stations, hotels and any other businesses, services or recreation areas or facilities the user would like information about. Again, the user may enter his request either vocally or by keypad, depending on the capabilities of handset 130. The request is communicated to server 136 over wireless network 140.

If the location of handset 130 was provided by an associated position determination system, the method proceeds directly to step 668. If the location was not provided, the user will be required to provide his current location at step 666. At step 668, server 136 searches database 138 and possibly other Internet resources for nearby businesses matching the user's request. As described above, limits or user preferences may be implemented to refine the request and selections returned. The user may set a location filter, for example, that requires returned selections be within X miles of the user's current location. If the user is seeking a restaurant, the user may set parameters such as cuisine type, restaurant type, price range and so on. Preferred national or regional chain may be set. In one implementation, server 136 in steps 606–610 (FIG. 8) automatically retrieves this information from handset 130.

In step 670, server 136 sends the retrieved information over network 140 to handset 130. The information is displayed on handset 130 (step 672), and may be listed or ranked according to proximity, price or any other user preference. The system then returns to step 616 of FIG. 8 and awaits another user selection from the home page index.

Figure 11:
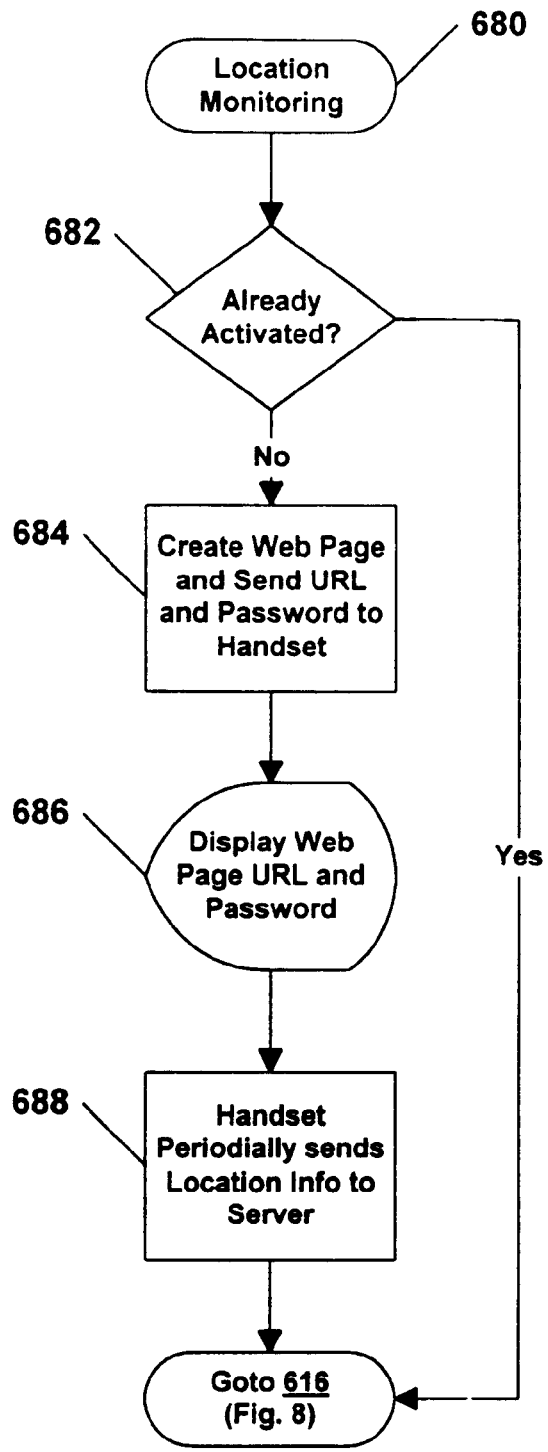
FIG. 11 is a flowchart of a location monitoring service portion of the information retrieval system.

If the location monitoring service is selected, the system proceeds to node 680 of FIG. 11. Server 136 initially determines whether this service has already been activated (decision node 682). If it has, nothing further is required and the user is returned to the main listing of services on the home page. If it has not been activated, server 136 creates a user web page or file where the user's locations are periodically posted and/or stored (step 684). Essentially, the location monitoring service creates a log of the user's whereabouts and makes the log available for the user to inspect. The web page URL and password required for entry are sent to the user over network 140 (step 684), and are displayed by handset 130 to the user in step 686. Handset 130 may automatically store this information locally, or may prompt the user as to whether he desires to do so. With the web page address and password in hand, the user can review his daily activities and travels by properly directing his handset minibrowser. Step 688 notes that, while the location monitoring service is active, handset 130 periodically sends updated location information to server 136. The method returns to step 616 to display the home page index.

Figure 12:
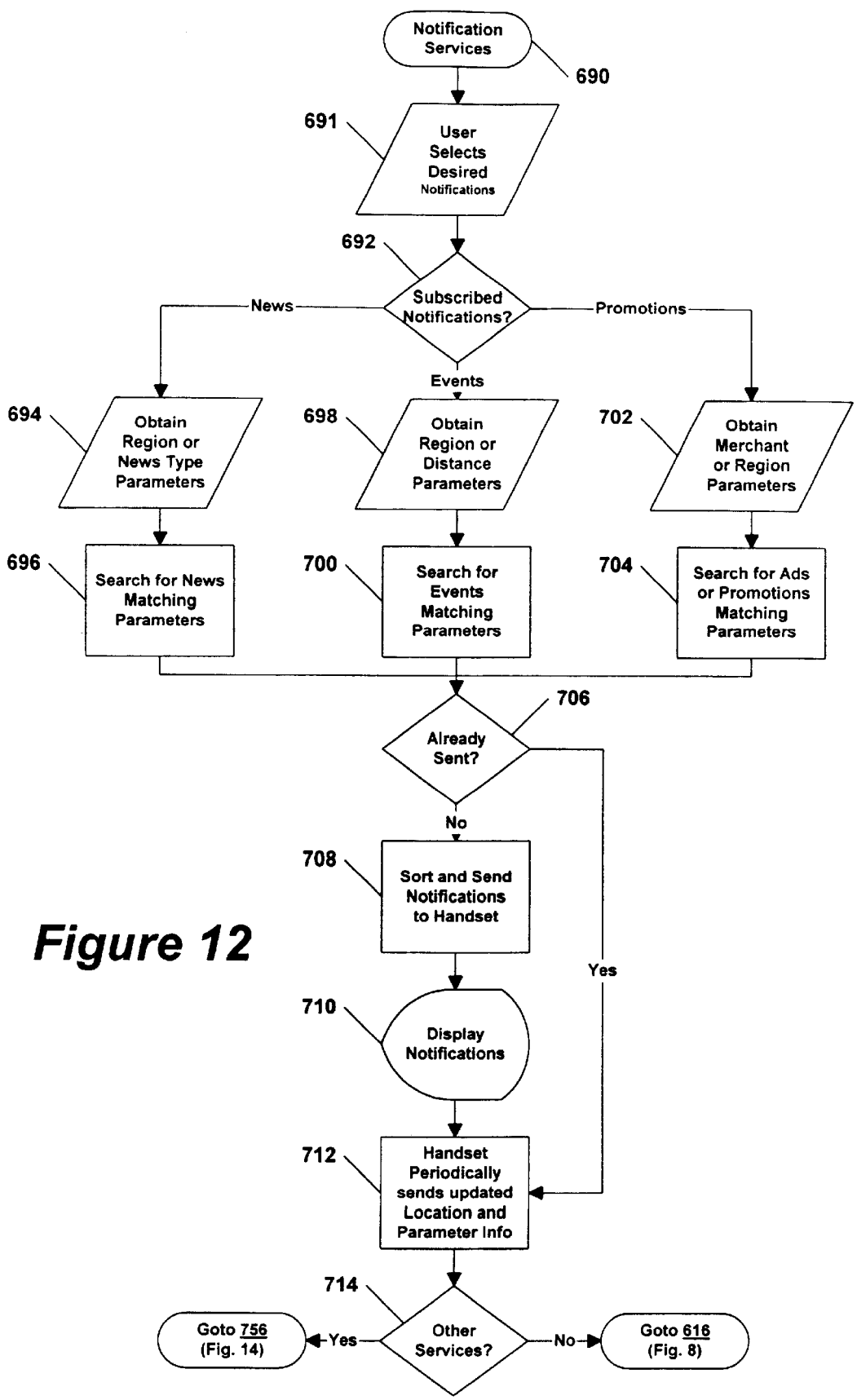
FIG. 12 is a flowchart of a notification services portion of the information retrieval system.

If notification services are selected from the home page, the information retrieval system proceeds to node 690 of FIG. 12. With this option, the user is automatically alerted about selected types of news, events, promotions, flight schedules, stock performance, etc. On the initial selection of this option, the user selects the types of events or information that he would like to subscribe to and be notified about (step 691). These selections may be later changed or deleted. At decision node 692, server 136 proceeds according to the notifications the user has subscribed to. Notifications or alerts about virtually any type of activity or event are possible. Three types of notifications—news, events and promotions—are shown in FIG. 12.

If the user has selected news notifications, the method proceeds to step 694. Server 136 obtains search parameters to define the types of news notifications provided to the user, such as the news type (i.e., politics, sports, headlines, entertainment, etc.) or region (city, county, state, national, world). These parameters may have already been retrieved by server 136 from handset 130 in steps 606–610 of FIG. 8. If not, the user may be prompted at step 694 to enter search parameters. At step 696, server 136 searches for news that falls within the search parameters.

If the user has selected event notifications, the method proceeds from node 692 to step 698. Server 136 obtains search parameters to define the types of event notifications provided to the user. Parameters may include the event type (i.e., community events, sporting events, theatre, arts, etc.), events within a certain region (city, county or state), or events occuring within a configurable mile radius of the user. These parameters may have already been retrieved by server 136 from handset 130 in steps 606–610 of FIG. 8. If not, the user may be prompted at step 698 to respond to queries to define the search parameters. At step 700, server 136 searches for events that fall within the search parameters.

If the user has selected promotion or sales notifications, the method proceeds from node 692 to step 702. Server 136 obtains search parameters to define the types of promotional or sales notifications provided to the user. Parameters may include merchant or service type (i.e., clothing, household goods, restaurants, etc.), or promotions/sales occuring within a defined region or configurable mile radius of the user. These parameters may have already been retrieved by server 136 from handset 130 in steps 606–610 of FIG. 8. If not, the user may be prompted at step 702 to respond to queries to define the search parameters. At step 704, server 136 searches for events that fall within the search parameters.

Once server 136 has retrieved all subscribed notifications matching the search parameters, it proceeds to node 706 and determines whether the notifications found in the search were already sent to the user. If the notifications were already sent, it is usually not necessary or desirable to send them to the user again, and the server proceeds directly to step 712. It should be noted, however, that the user may set her preferences to eliminate this step if she wishes to receive all notifications found, even if they were previously sent. If the notifications have not yet been sent to the user, the notifications are sent to handset 130 over network 140 (step 708). The notifications may be sorted according to the user's preferences such as, for example, by region, proximity, price, merchant-type and so on. At step 710, handset 130 displays the received and sorted notifications.

So long as the notification service is active, handset 130 periodically sends updated location and user preference information to server 136 (step 712). As will be described with reference to FIG. 14, when server 136 receives such updates, it initiates a routine to perform all services the user is subscribed to. At decision node 714, server 136 determines whether the user is subscribed to other services. If the user is subscribed to other services, the method returns to step 756 of FIG. 14 to perform the remaining services. If the user is not subscribed to other services, the user is presented with the main home page display of service options (step 616 of FIG. 8).

As will be discussed in more detail with reference to FIGS. 15–17, the alert messages or notifications are typically sent in a Short Message Service (SMS) format. Tile present invention provides a method for attaching advertising or promotional messages to the alert messages. This method will be discussed in detail below.

FIG. 14 depicts the steps followed by server 136 each time a location or user information update is received from handset 130 (step 752). Such updates are sent periodically by handset 130 whenever the location monitoring, traffic monitoring and/or notification services are active. At step 754, upon receiving an update from handset 130, server 136 determines which services handset 130 subscribes to. From node 756, server 136 performs the subscribed services. For location monitoring, at step 758, server 136 updates the user record and/or web page with the location information received from handset 130. At step 760, server 136 determines whether handset 130 is subscribed to additional services. If it is, the method loops back to step 756 to perform the additional services. If it is not, the user is returned to the home page list of options. For notification services, server 136 proceeds with step 692 of FIG. 12. For traffic monitoring services, server 136 proceeds with step 720 of FIG. 13.

As described in more detail below, the method steps of FIGS. 8–14 may be implemented as computer programs, software or hardware. The portions relating to control of handset 130 may be coded in processor 104 or could be stored in memory 114. Alternatively, the program or portions of it could be stored on server 136 and downloaded to handset 130 as needed. The portions relating to the steps carried out by server 136, such as FIG. 14, preferably reside in a processor or memory in server 136.

5. A Method for Attaching an Advertisement to an SMS Alert Message

Figure 15:
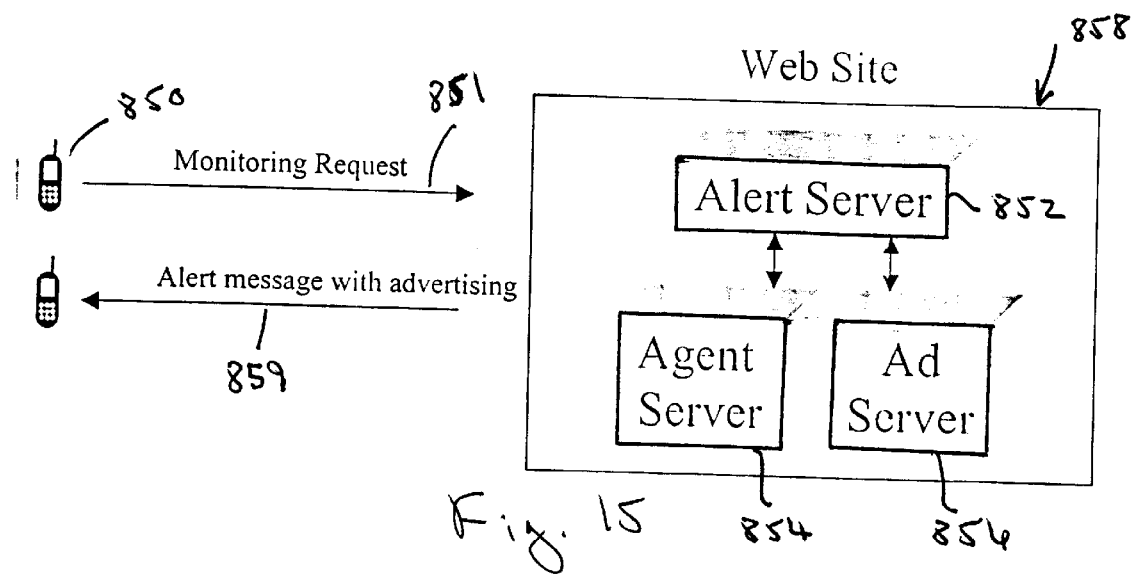
FIG. 15 is an overview of a method for attaching an advertising message to an alert message sent by a server to a wireless device.
Figure 14:
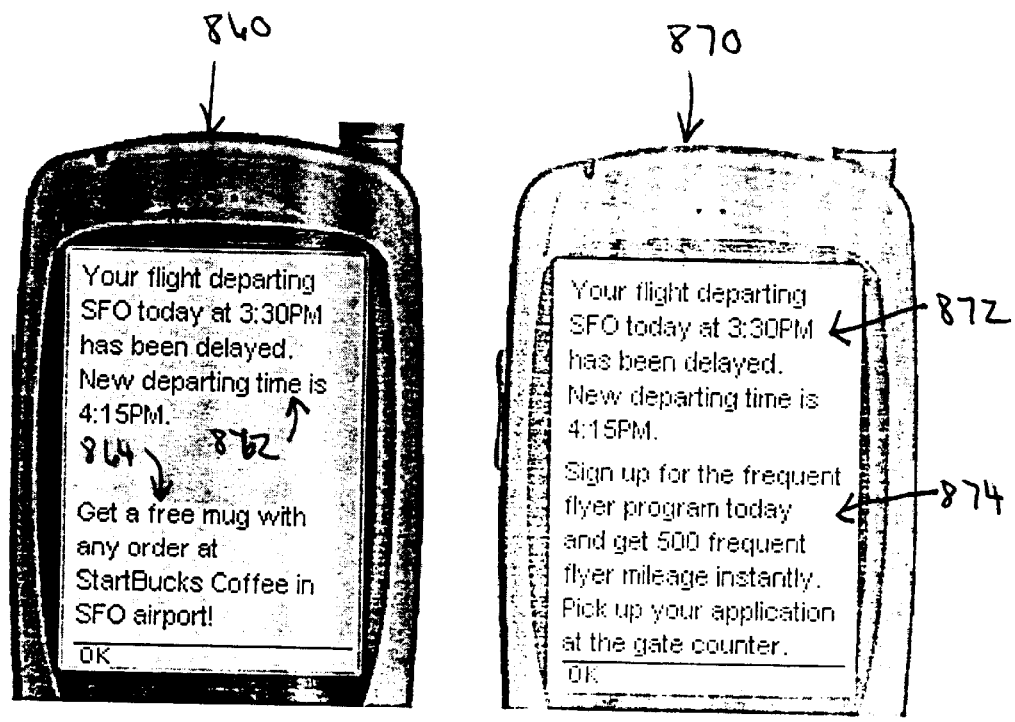

FIG. 15 is an overview of a method for appending advertising or promotional messages to the alert messages generated when the user selects the notification or alert service (see FIG. 12, above). The user's wireless handset 850 sends a monitoring request 851 over the wireless network requesting the server 858 to send an alert message if certain conditions are met. A number of examples of the type of conditions or events the user may wish to be notified about were given above with respect to FIG. 12. The user, for example, may wish to be alerted if his departing flight is delayed or gate number is changed. Monitoring request 851 could alternatively be sent to server 858 via a personal computer (PC).

Server 858 may be a part of an Internet web site, and includes an alert server 852, an agent server 854, and an ad server 856. When server 858 receives monitoring request 851, agent server 854 monitors appropriate databases, Internet web sites, and other sources of information, which may include other agents, for the occurrence of conditions that would meet the user's request. When the conditions are met, agent server 854 generates an SMS alert message and requests ad server 856 to append any advertising. Based on the alert message content, user location and preferences, and available ad space, an ad message is generated by server 856 and appended to the alert message. Alert server 852 then sends the alert message with appended advertising (859) to the user's handset 859.

FIG. 16 shows examples of alert messages and appended ad messages on wireless handset displays 860 and 870. In this example, the user has sent a monitoring request to the server requesting to be alerted if changes occur with her itinerary. The server has determined that the user's flight has been delayed from 3:30 PM to 4:15 PM, and generates appropriate alert messages 862, 872. Based on the user's profile (i.e., coffee drinker or frequent flyer program member), the alert message content (flight delay), and the user's location (airport or nearby), the ad server generates an appropriate ad message that is appended to the alert message. Ad message 864, for example, notifies the user of a coffee promotion in the airport. Ad message 874 notifies the user of a frequent flyer promotion in the airport.

Figure 17:
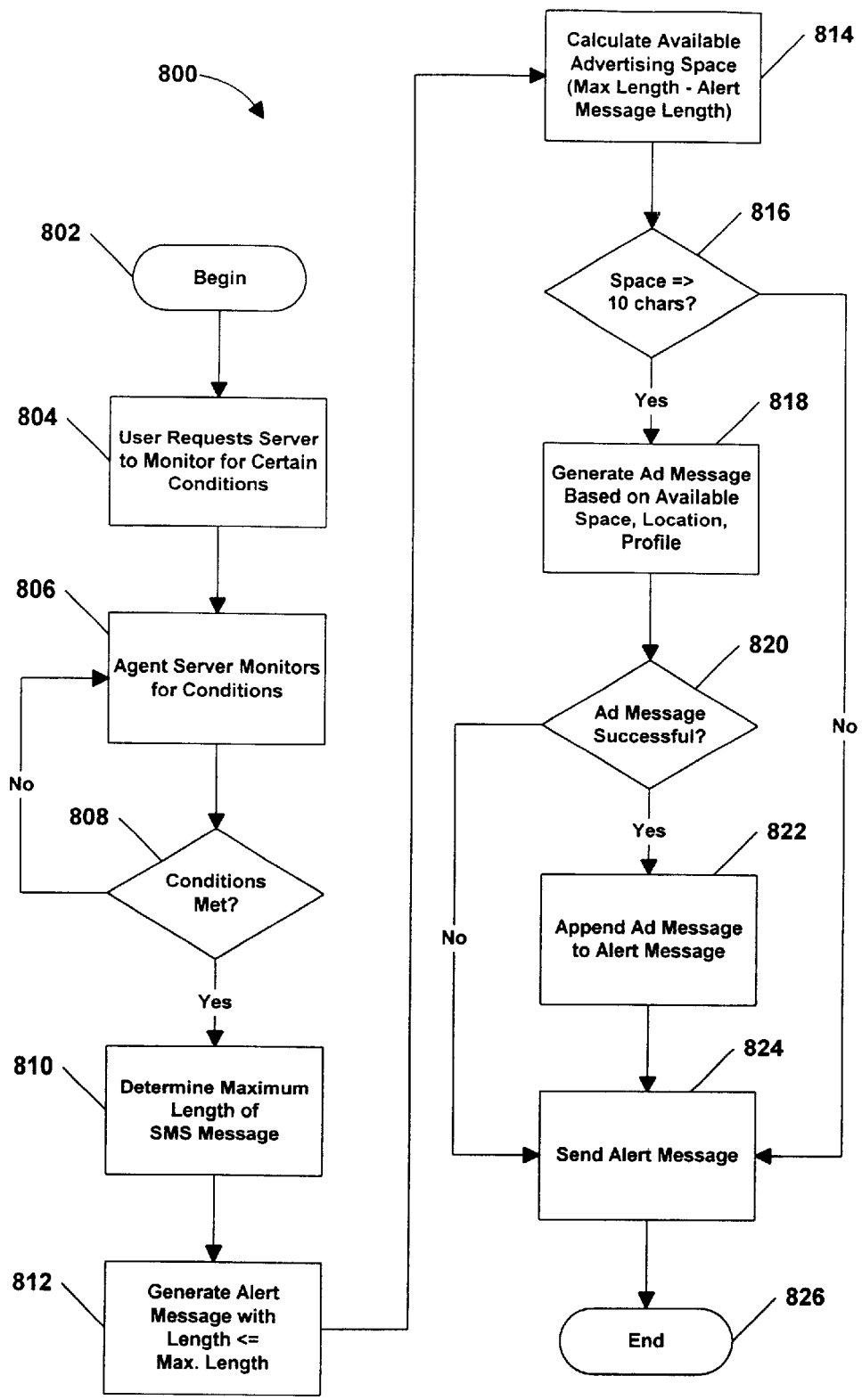
FIG. 17 is a flowchart of a method for attaching an advertising message to an alert message.

FIG. 17 depicts in more detail a method 800 for appending an ad message to an alert message generated by the server. Typically, the alert messages are in SMS (Short Message Service) format, which is a well-known standard for wireless transmission of short messages. The message can comprise letters, numbers or an alphanumeric combination, and typically has a maximum character length. The maximum character length will depend on the service provider, but is typically in the range of 100–200 characters. The SMS messages may be sent and received simultaneously with a voice, data or fax call.

In step 804, the user (via handset or PC 850) sends a monitoring request 851 requesting the server 858 to monitor for certain conditions. In response to this request, agent server 854 (step 806) monitors for the conditions (as described above). At decision node 808, if the conditions are not met, agent server 854 continues to monitor for the conditions. If the conditions are met (the user's flight is delayed, for example), the method proceeds to step 810, where server 858 determines the maximum length, in characters of the SMS message. As noted above, this will typically be in the range of 100–255 alphanumeric characters.

In step 812, alert server 852 generates an alert message having a length in characters that is less than or equal to the maximum SMS message length. Example alert messages 862 and 872 are shown in FIG. 16. Based on the length of the alert message generated and the maximum SMS message length, alert server 852 determines how many character spaces are available for an ad message. Generally, if more than ten characters are not available (decision node 816), no ad message is generated and the method proceeds directly to step 824 and sends the alert message to the handset 850.

If more than ten characters are available, ad server 856 generates an ad message based on the user's profile, alert message content and location (step 818). Example messages 864 and 874 are shown in FIG. 16. If the ad message is successfully created (decision node 820), alert server 852 appends the ad message to the alert message (step 822), and at step 824 the composite message 859 (alert message and appended ad message) is sent to device 850. If the ad message was not successfully created, the alert message alone is sent to device 850.

6. Additional System Details

Figure 4:
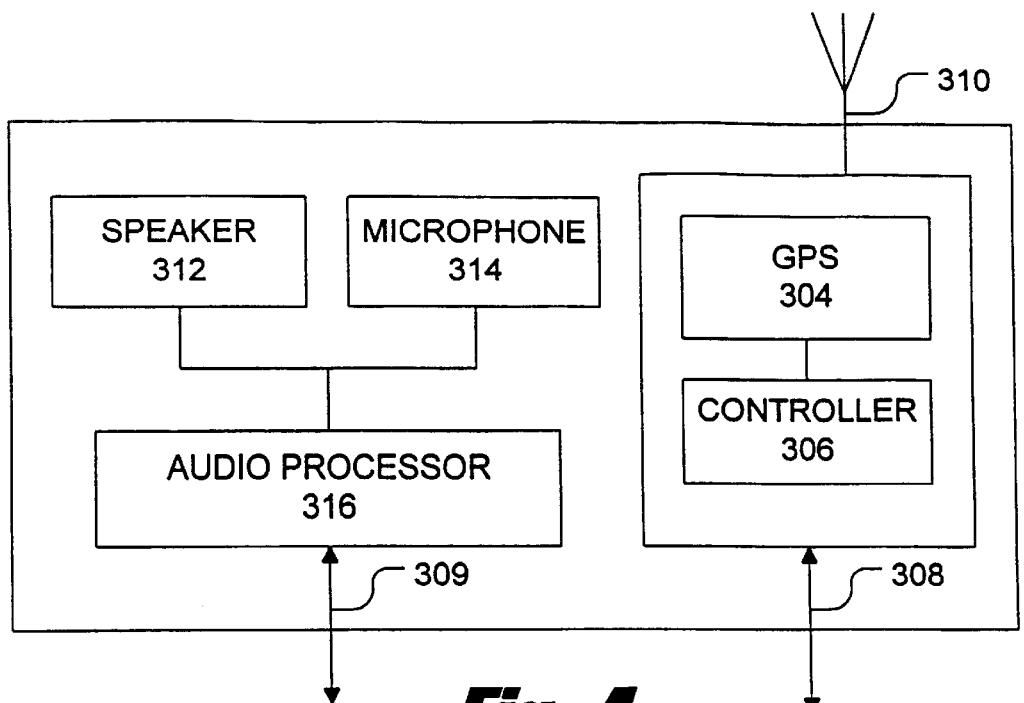
FIG. 4 is a block diagram of a hands-free unit having a GPS receiver according to one embodiment of the present invention.

As stated above, in one embodiment, position-determination device 134 is located in hands-free unit 132. FIG. 4 illustrates one implementation of a hands-free unit 132, including a GPS receiver 304 that functions as the position determination device and an associated controller 306. Position information is exchanged with wireless handset 130 via data in-out interface 308. Antenna 310 allows GPS receiver 304 to communicate with the constellation of GPS satellites. As stated above, alternative position determination devices could be implemented if desired. Speaker 312 and microphone 314 provide speakerphone-like capabilities to wireless device 130. Audio processor 316 provides A/D, D/A and echo canceling for voice digitization or synthesis. Preferably, the digitized voice is in the form of PCM (pulse code modulated) data, although other data coding techniques could be utilized.

As described above, voice synthesis and/or recognition capabilities may be provided. In one implementation, voice synthesis and recognition are provided in hands-free unit 132. Alternatively, wireless device 130 or server 136 could provide these capabilities.

Figure 5:
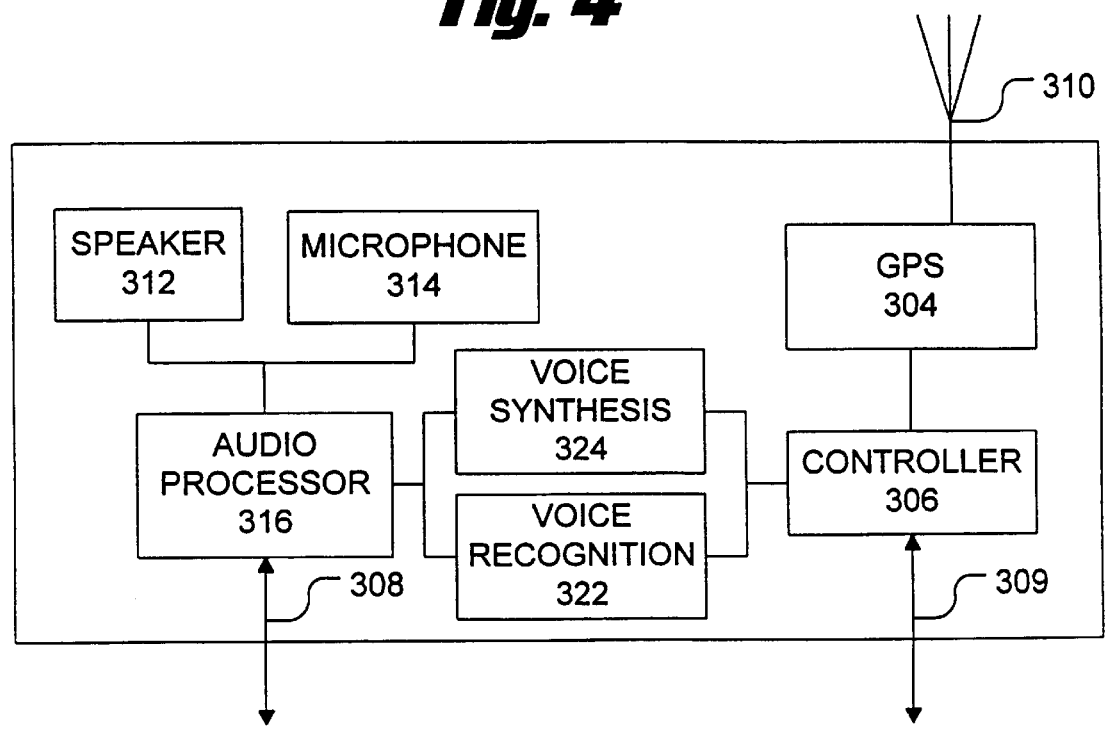
FIG. 5 is a block diagram of a hands-free unit having a GPS receiver and voice synthesis and recognition according to another embodiment of the invention.

FIG. 5 shows an example implementation of hands-free unit 132 with voice synthesis and recognition. In this implementation, user speech commands are received by microphone 314, digitized by audio processor 316 and processed by voice recognition algorithm 322. The processed speech commands are provided to controller 306 and sent to server 136 as data 309. Similarly, information retrieved by server 136 can be provided to controller 306 and voice synthesizer 324. Voice synthesizer 324 converts this information to digital voice data, which is processed by audio processor 316 and announced to the user via speaker 312. Additionally, audio information can be provided to audio processor 316 via audio in-out communication path 308. Where server 136 performs speech synthesis or recognition, digital voice data is sent across network 140 and is provided to, or received from, the user via audio in-out connection 308.

Where position determination device 134 is located in hands-free unit 132, wireless device 130 sends a location information request message to hands-free unit 132. Hands-free unit 132 in response sends a location information response message to the handset 130. The location information response includes parameters indicating position such as time, longitude, latitude, height, speed, and data age.

FIG. 6 is a diagram illustrating an example format for the location information request 404 and the location information response 408. As noted above, these messages may be in SMS format. Location information request 404 is a one-byte data field. Response 408 includes several fields, including time 410, longitude 412, latitude 414, height 416, speed 418 and data age 420. Time field 410 is six bytes in length, longitude field 412 is nine bytes in length, latitude 414 is eight bytes in length, height field 416 is eight bytes in length, speed field 418 is three bytes in length, and data age 420 is one byte in length. As would be apparent to one of ordinary skill in the art, other message formats and field lengths could be utilized.

In one embodiment, the time is GPS time of day in seconds and is in ASCII format. Longitude, latitude and speed are also in ASCII format, with the longitude data being positive east, the latitude data being positive north and the speed being in miles per hour. The data age reflects the age of the return data and can indicate whether the data is fresh, old, or otherwise not available. Data is listed as fresh if it is less than ten seconds of age, or old if it is greater than or equal to ten seconds. Of course, alternative formats can be provided and alternative time frames established for determining if data is fresh or old.

A status request and response may be used to query the status of position determination device 134 before requesting location information. This is particularly useful if position determination device is implemented as a GPS receiver. The request message may be one byte in length and simply request the status of the GPS receiver. In this implementation, the response may be a one byte status word indicating whether the device is ready. The response could include additional information such as, for example, the reason the status is ready or not ready, or any other pertinent information.

Figure 7:
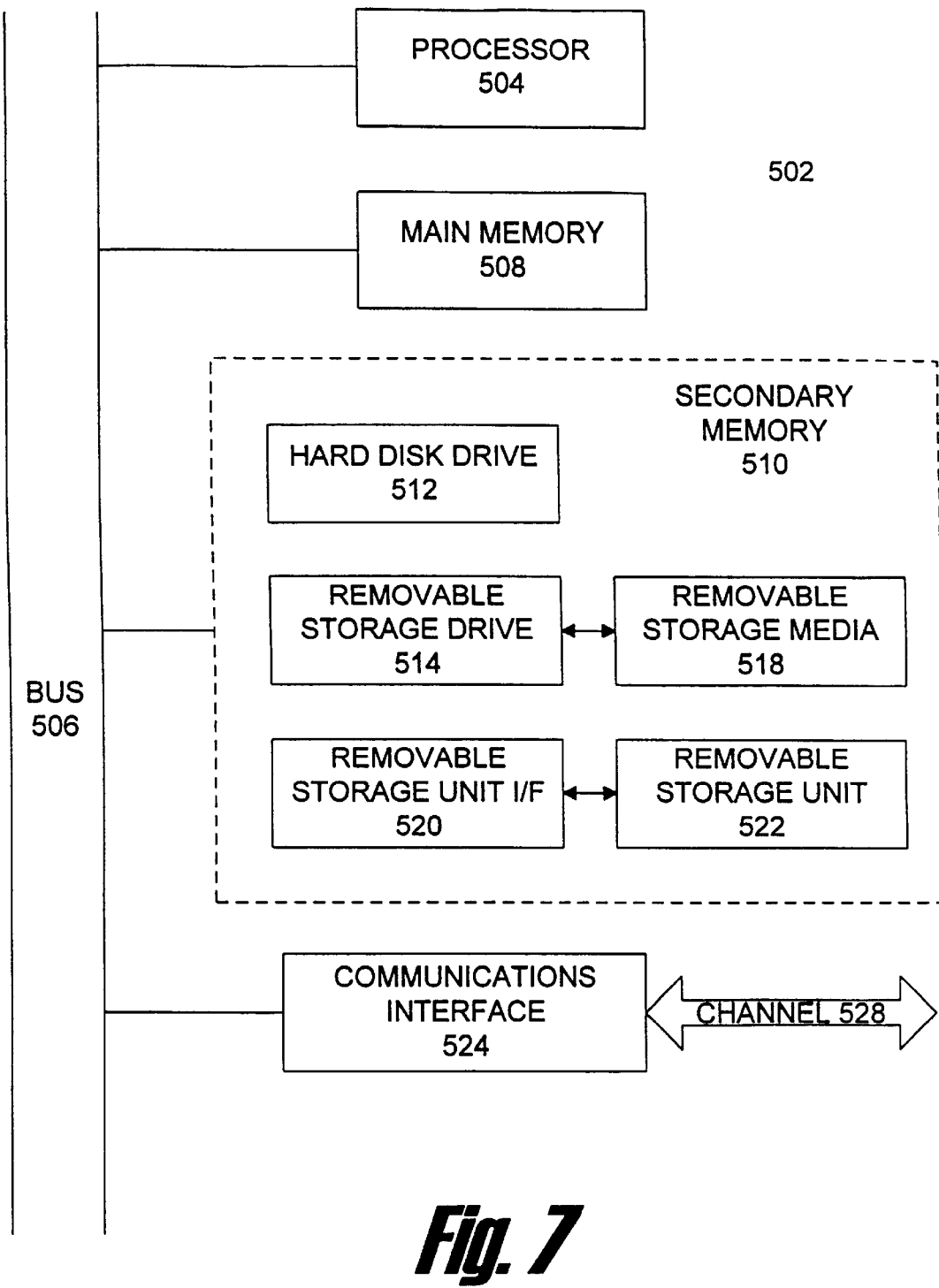
FIG. 7 is a block diagram of a processor-based system according to one embodiment of the invention.

The various embodiments and features of the invention described above may be implemented with hardware, software or a combination thereof and may be implemented using a computing system having one or more processors. In one embodiment, these elements are implemented using a processor-based system capable of carrying out the functionality described with respect thereto. An example processor-based system 502 is shown in FIG. 7. System 502 includes one or more processors, such as processor 504. Processor 504 is connected to communication bus 506.

System 502 includes main memory 508 and secondary memory 510. Main memory 508 is preferably random access memory (RAM), and secondary memory 510 preferably includes hard disk drive 512 and/or a removable storage drive 514. Removable storage drive 514 is typically a floppy disk drive, a magnetic tape drive, an optical disk drive or the like. Storage drive 514 reads from and writes to removable storage media 518 in a well-known manner. Storage media 518 is typically a floppy disk, magnetic tape, optical disk or the like having stored therein computer software and/or data.

Secondary memory 510 may include additional or alternative means for allowing computer programs or other instructions to be loaded into computer system 502. A removable storage unit 522 and interface 520, for example, may be provided. Interface 520 and storage unit 522 could take the form of a program cartridge and cartridge interface (such as that found in video game devices), or a removable memory chip (such as an EPROM, or PROM) and associated socket.

Communications interface 524 allows software and data to be transferred between computer system 502 and external devices. Examples of communications interface 524 include a modem, a network interface (such as, for example, an Ethernet card), a communications port, or a PCMCIA slot and card. Software and data is transferred via communications interface 524 as electronic, electromagnetic, optical or other signals capable of being received by communications interface 524. These signals are provided to communications interface via channel 528. Channel 528 carries signals and can be implemented as a wireless medium, wire or cable, fiber optics, or other communications medium. Examples include a phone line, a cellular phone link, an RF link or a network interface.

In this document, the terms "computer program medium" and "computer usable medium" are used to generally refer to media such as removable storage device 518, a disk capable of installation in disk drive 512, and signals on channel 528. These computer program products are means for providing software or program instructions to computer system 502. Computer programs (also called computer control logic) are stored in main memory and/or secondary memory 510. Computer programs can also be received via communications interface 524. Such computer programs, when executed, enable the computer system 502 to perform the features of the present invention as discussed herein. In particular, the computer programs, when executed, enable the processor 504 to perform the features of the present invention. Accordingly, such computer programs represent controllers of the computer system 502.

In an embodiment where the elements of the invention are implemented using software, the software may be stored in, or transmitted via, a computer program product and loaded into computer system 502 using removable storage drive 514, hard drive 512 or communications interface 524. The control logic (software), when executed by the processor 504, causes processor 504 to perform the functions of the invention as described herein.

In another embodiment, the elements are implemented primarily in hardware using components such as PALs, application specific integrated circuits (ASICs) or other hardware components. Implementation of a hardware state machine to perform the functions described herein will be apparent to persons skilled in the relevant art(s). In yet another embodiment, elements are implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A monitoring and alert system comprising:

a requesting device comprising a transmitter for sending a monitoring request and a receiver for receiving an alert message via a wireless communication network;

a remote server in communication with the requesting device over the network, wherein the server receives the monitoring request from the requesting device and monitors for conditions specified by the requesting device in the monitoring request and, when the conditions are met, generates an Short Message Service (SMS) alert message and upon determination of adequate remaining message space appends an ad message to the alert message in the remaining space to create a composite alert/ad message, the server sending the composite alert/ad message to the requesting device.

2. A system as claimed in claim 1, and further comprising a position determination device for determining the location of the requesting device, wherein the location is provided to the server to assist in generation of the composite message.

3. A system as claimed in claim 2, wherein the requesting device further comprises a memory for storing user profile information, and wherein the user profile information is provided to the server to assist in generation of the composite message.

4. A system as claimed in claim 1, wherein the server comprises an agent server that monitors for the conditions specified by the requesting device; an ad server that generates the ad message; and an alert server that generates the alert message and appends the ad message to the alert message to create the composite message.

5. A system as claimed in claim 1, wherein the requesting device is a wireless communication device including a display for displaying the composite message received from the server.

6. A system as claimed in claim 1, wherein the ad message comprises an advertisement or a promotion.

7. A method for appending an advertisement to an SMS message comprising the following steps:

(a) determining the maximum length in characters of the SMS message;

(b) generating a first portion of the SMS message;

(c) determining an available advertising message space by subtracting the length in characters of the first portion from the maximum length;

(d) determining whether the available advertising message space is sufficient for placement of an advertisement; and (e) if the available space is sufficient, generating the advertisement and appending it to the first portion of the SMS message.

8. A method as claimed in claim 7, and comprising the additional step prior to step (a) of determining whether user-specified conditions for generating the SMS message have been met.

9. A method as claimed in claim 8, wherein the first portion of the SMS message is an alert message notifying a user that the user-specified conditions have been met.

10. A method as claimed in claim 9, wherein the advertisement is generated based on the content of the alert message, the location of the user, and a user profile.

11. A method as claimed in claim 7, wherein the maximum length of the SMS message is in the range of 100–255 alphanumeric characters.

12. A method as claimed in claim 7, wherein step (d) comprises determining whether the available advertising space comprises more than ten characters.

13. A method as claimed in claim 7, and comprising a first additional step prior to step (a) of receiving a monitoring request from a requesting device over a wireless network, and a second additional step after step (e) of sending the SMS message to the requesting device over the wireless network.

* * * * *